Jan. 20, 1959 R. E. THOMAS 2,869,784
MULTIPLIER CIRCUIT
Filed July 9, 1953
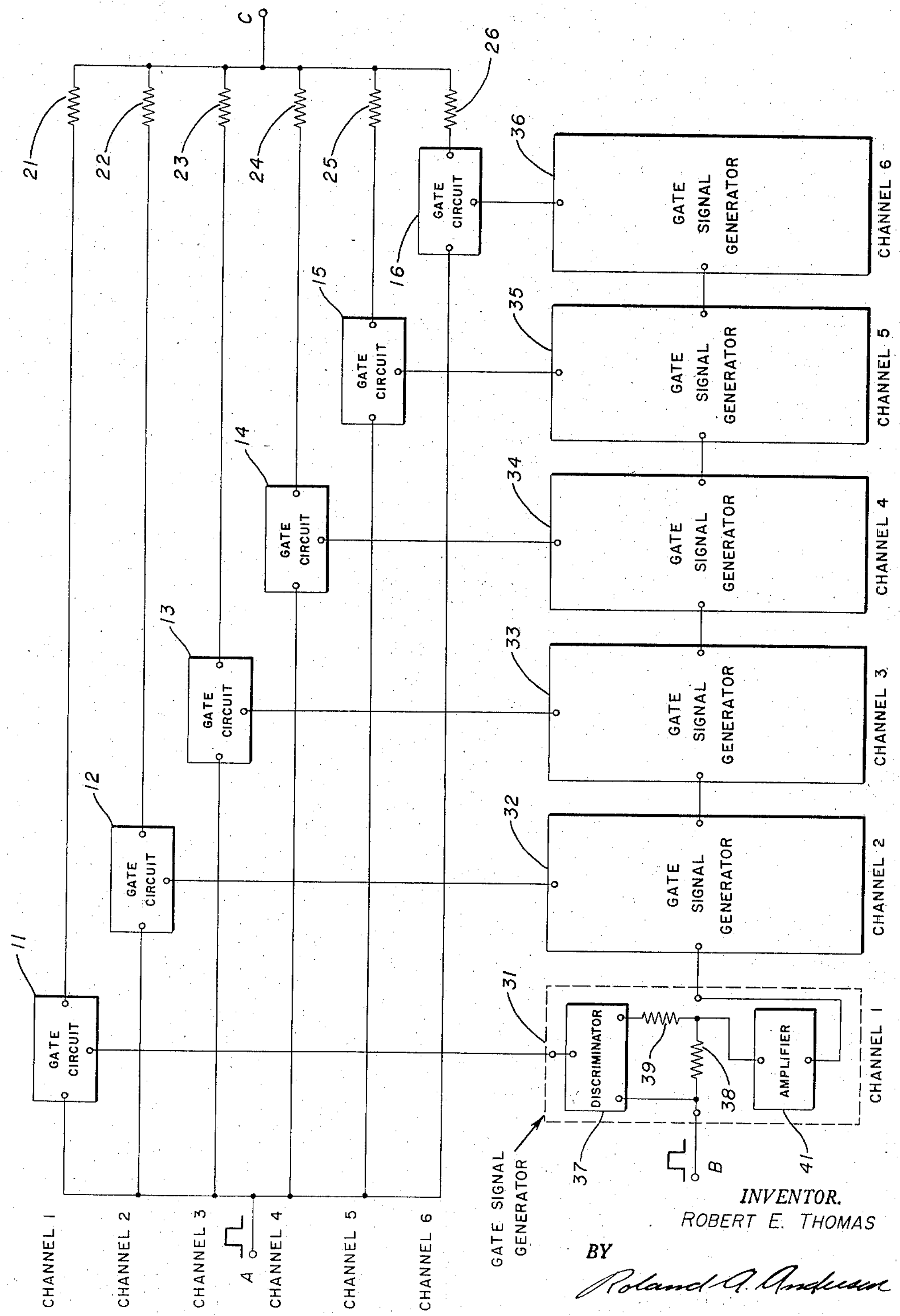
INVENTOR.
ROBERT E. THOMAS
BY Roland A. Anderson
ATTORNEY.

United States Patent Office 2,869,784

Patented Jan. 20, 1959

2,869,784

MULTIPLIER CIRCUIT

Robert E. Thomas, Walnut Creek, Calif., assignor to the United States of America as represented by the United States Atomic Energy Commission Application July 9, 1953, Serial No. 366,920

8 Claims. (Cl. 235—61)

The present invention relates to an improved electronic circuit for multiplying voltage pulses and employing a digital or binary system wherein selected portions of one input signal are multiplied by another input signal and the product signals are added together to provide a resultant signal proportional to the product of two input signals.

While the present invention may be employed in a variety of ways and is useful wherever it is desired to obtain the product of two voltage signals, one particular application may be noted in the field of nuclear particle identification. Thus, it has been determined that for any single kind of particle, such as a proton, for example, the product of the energy loss per unit distance and the total energy loss in stopping the particle in a particular material is a constant. Apparatus may be readily constructed to produce a voltage signal proportional to the energy loss per unit distance by a particle transversing a material and to produce a voltage signal proportional to the total energy loss of this particle stopped in a material. By providing an electronic multiplier circuit receiving these signals, ready and instantaneous particle identification is realized without the necessity of obtaining absolute signal strengths and manually multiplying same. Of course numerous applications of the invention may be found, as for example in certain electronic calculators, and the above example is intended only as such without being in any way limiting.

The present invention operates to multiply one input signal by predetermined voltage levels of the other input signal to produce an output signal proportional to the product of the input signals and the illustrated embodiment of the invention employs a binary system although other systems may of course be employed.

It is an object of the present invention to provide an improved multiplier circuit.

It is another object of the present invention to provide a multiplier circuit having a plurality of parallel-connected resistors of predetermined values upon selected ones of which are impressed one voltage signal in accordance with the magnitude of another voltage signal whereby the summation of the voltages across these resistors is proportional to the product of said voltage signals.

It is a further object of the invention to provide a multiplier circuit having a plurality of channels including gate circuits selectively passing one input signal in accordance with the magnitude of another input signal.

It is yet another object of the present invention to provide an improved multiplier circuit having a plurality of identical channels impressing a first input signal upon selected resistors in response to a second signal whereby the summation of resistor potentials is proportional to the product of said first and second signals.

Numerous other possible objects and advantages of the invention will become apparent to those skilled in the art from the following description of the invention taken together with the accompanying drawing illustrating a preferred embodiment thereof and wherein the sole figure is a block diagram of the circuit of the invention.

Considering now the circuit of a preferred embodiment of the invention and referring to the drawing illustrating same, there will be seen to be provided a pair of input terminals A and B upon which there are to be impressed positive voltage signals to be multiplied and identified as signals A and B for convenient reference. Preferably these signals are positive square wave voltage pulses, as illustrated. In the illustrated circuit there are provided six channels, numbered 1–6 in the drawing, and extending between input terminal A and an output terminal C. There are provided in each of the channels 1–6 a gate circuit, numbered 11–16, and operating to selectively pass input signals A in accordance with input signals B. There are connected between each of the gate circuits 11–16 and output terminal C, resistors 21–26, respectively, which are thus connected in parallel and which have progressively increasing resistance values from channel 1 to channel 6. With the binary system herein employed, the resistance of resistor 21 may be taken as one unit and in this case resistors 22–26 would have resistance values of 2, 4, 8, 16, and 32 units, respectively.

The above-noted gate circuits 11–16 selectively pass the A input signals in accordance with the magnitude of the B input signals and there are provided for control of the gate circuits six gate signal generators 31 to 36 which are connected in series from input terminal B. Each of the gate signal generators are connected to a single corresponding gate circuit to actuate same with the first gate signal generator 31 being connected to first gate circuit 11 and so on, so that the gate signal generators correspond to or form a part of the above-mentioned channels 1–6. Each of the gate signal generators are identical and considering, for example, gate signal generator 31, it will be seen to include a discriminator 37 having a voltage divider connected thereacross and including like resistors 38 and 39. Input terminal B is connected to one end of the voltage divider and thus to the discriminator input so that a sufficiently large input signal will trigger the discriminator to produce an output signal which is in turn applied to the gate circuit 11 to actuate same. Dscriminator 37 produces not only a gate signal but also produces a signal equal to the discriminator bias and of opposite polarity, which signal is applied to the opposite end of the voltage divider. This signal may be conveniently produced by including in the discriminator 37 a paraphase amplifier as defined in Electronics Dictionary, by Cooke & Markus (1945), page 257, wherein signals of opposite polarity are taken from the anode and cathode circuits. The discriminator 37 need only include in addition to the paraphase amplifier, conventional amplitude discriminator means such as described in Electronics by Elmore & Sands (1949), page 202, et seq. The positive signal so produced may then be employed as the gate signal and the negative signal applied to one end of the voltage divider. With regard to the action of the voltage divider, there is applied to one end thereof the B input signal and to the opposite end thereof a negative signal equal to the discriminator bias so that it will be apparent that the voltage at the divider center, i. e., the juncture of resistors 38 and 39, will be equal to one-half the difference between the B input signal and the discriminator bias. With the above-noted binary system being employed, the discriminator bias may be set at 32 units, here considered for convenience as 32 volts so that the voltage at the juncture of resistors 38 and 39 is $B/2-16$ volts, wherein B is here taken as the magnitude of the B input signal.

In addition to the above-noted elements and connections of the gate signal generators 31 to 36 there is additionally provided in each an amplifier, identified as amplifier 41 in gate signal generator 31. The input of amplifier 41 is connected to the midpoint of the voltage divider and the amplifier output is applied to the input of the next signal generator 32. Amplifier 41 produces an amplification of four so that the signal $B/2-16$ at the midpoint of the voltage divider is multiplied by four to produce a signal $4(B/2-16)=2(B-32)$ which is applied to the input of gate signal generator 32. Inasmuch as each gate signal generator is the same, even as to discriminator bias, it will be seen that there is applied to the second discriminator a signal equal to twice the difference between the input signal and the discriminator bias, assuming the input signal is larger. When the signal applied to any gate signal generator is too small to overcome the discriminator bias no negative signal is applied to the other end of the voltage divider so that the signal to the generator is merely divided in half by the voltage divider and multiplied by four in the amplifier to produce a net signal twice as large as that applied.

Considering now an example of operation wherein the B input signal has a magnitude of forty volts, this signal when applied to the discriminator 37 of gate signal generator 31 will overcome the 32 volt bias thereof so that discriminator 37 will produce a gate signal which is applied to gate circuit 11 of channel 1 and will further produce a 32 volt negative pulse which is applied to one end of the voltage divider. With the 40 volt positive pulse applied to one end of the voltage divider and a 32 volt negative pulse to the other a resultant four volt positive pulse will occur at the voltage divider midtap. This four volt signal is applied to amplifier 41 and therein multiplied by four to produce a 16 volt signal which is applied to gate signal generator 32. As the 16 volt signal is insufficient to overcome the 32 volt discriminator bias, the discriminator is not triggered so that no gate signal is produced and no negative signal is applied to the voltage divider. Consequently, the 16 volt signal is equally divided across the voltage divider to produce an eight volt signal at the midtap thereof and multiplication of same by four in the amplifier produces a 32 volt signal for application to gate signal generator 33. The 32 volt signal applied to gate signal generator 33 equals the 32 volt bias of the discriminator thereof so that same is triggered to produce a gate signal for actuating gate circuit 13 and a negative 32 volt signal at one end of the voltage divider. With a positive 32 volt signal applied to one end of the voltage divider and a negative 32 volt signal applied to the opposite end thereof, a zero voltage results at the center point so that no signal is applied to the subsequent gate signal generators and the corresponding gate circuits 14–16 remain closed or not activated.

As a consequence of the B input signal gate circuits 11 and 13 in channels 1 and 3, respectively, are activated to pass an A input signal applied simultaneously with the B input signal The A input signal is thus applied to resistors 21 and 23 in channels 1 and 3, respectively, and it will be appreciated that the C signal at output terminal C is inversely proportional to the resistances 21–26 through which the A signals are applied, the relationship actually being a summation of the products of resistance-voltage values divided by the summation of the resistances. There may be employed an amplifier in the circuit output to increase the amplitude of the output signal so that it is actually equal to the product of the A and B signals rather than merely proportional thereto.

It will be appreciated that in the foregoing example of operation if the B input signal had a magnitude of 41 volts instead of the 40 volts cited, the final gate signal generator 36 would also have been actuated in addition to generators 31 and 33 so that the A input signal would have been passed in channels 1, 3, and 6. It is noted that the final gate signal generator 36 need not include an amplifier for it does not feed any further circuit.

Although the present invention has been described with respect to a single embodiment it will be appreciated by those skilled in the art that numerous modifications and variations thereof are possible within the spirit and scope of the invention and thus the invention is not to be limited except by the terms of the following claims.

What is claimed is:

1. A multiplier circuit comprising first and second input terminals adapted to have impressed thereon simultaneous voltage pulses to be multiplied, an output terminal, a plurality of resistors connected in parallel between said first input terminal and said output terminal with said resistors having different resistance values, a plurality of gating circuits connected one in series with each of said resistors, and a plurality of gate signal generators connected in series to the second of said input terminals for producing gate signals in accordance with the amplitude of the signal at said second input terminal, and means impressing said gate signals individually upon corresponding gate circuits whereby certain gate circuits are activated and the input signal at said first input terminal is applied to particular resistors thereby producing at said output terminal a signal proportional to the product of input signals.

2. A multiplier circuit comprising a pair of input terminals adapted to receive first and second input pulses, an output terminal, a plurality of resistors connected in parallel between one of said input terminals and said output terminal and said resistors having progressively larger resistance values, and means for applying said first input signal to selected resistors in accordance with the amplitude of said second input signal whereby the resultant signal at said output terminal is proportional to the product of said input signals.

3. A multiplier circuit comprising a plurality of parallel-connected resistors of which each has twice the resistance value of the preceding resistor, an output terminal connected to one end of said resistors, and means impressing a first input signal upon selected ones of said resistors in accordance with the magnitude of a second input signal whereby the signal at said output terminal is proportional to the product of said input signals.

4. A multiplier circuit comprising a plurality of resistors with each having twice the resistance of the preceding resistor and said resistors being connected in parallel, an output terminal connected to one end of said resistors, a plurality of gating circuits connected one in series with each of said resistors, means applying a first input signal to each of said gate circuits for selective passage thereby, and a plurality of serially-connected gate signal generators connected one to each of said gating circuits for selectively activating same and being adapted to receive a second input signal, said gate signal generators each including signal discriminating means for operation in accordance with the magnitude of applied second input signals whereby said gating circuits selectively pass said first input signals in accordance with the magnitude of said second input signals and the signal at said output terminal is thereby proportional to the product of said input signals.

5. An improved multiplier comprising first and second input terminals adapted to receive simultaneous signals for multiplication, an output terminal, a plurality of gating circuits connected in parallel between said first input terminal and said output terminal, a plurality of gate signal generators connected in series to said second input terminal and each including discriminating means whereby a predetermined signal amplitude triggers same, each of said gate signal generators being connected to one of said gating circuits for actuating same, and a plurality of graduated resistors connected one in series with each of said gating circuits whereby said first input terminal is connected to said output terminal through selected resistors in accordance with the amplitude of the signal at said second input terminal to thereby produce at said output terminal signals proportional to the product of the signals at said first and second input terminals.

6. An improved binary multiplier comprising first and second input terminals adapted to receive simultaneous input pulses for multiplication, an output terminal, a plurality of resistors connected in parallel between said first input terminal and said output terminal with said resistors having graduated resistance values wherein the second resistor has twice the resistance of the first resistor, the third resistor has twice the resistance of the second resistor, etc., a plurality of gate signal generators including discriminator means connected in series to said second input terminal and producing gate signals in response to input signals having amplitudes in excess of predetermined discriminator voltage levels of said generators, and a plurality of gating circuits connected one in series with each of said resistors for gating signals from said first input terminal to said output terminal, said gate circuits being connected to said gate signal generators for actuation thereby and the gate signal generator discriminator voltage levels being inversely related to the resistance values of said resistors as by the highest voltage level generator actuating the gate circuit in series with the smallest resistor whereby the resultant signals at said output terminal are proportional to the product of input signals at said input terminals.

7. A multiplier circuit comprising first and second input terminals adapted to receive simultaneous input signals for multiplication, an output terminal, six channels extending between said first input terminal and said output terminal with each including a gating circuit and a serially connected resistor, the resistors of channels one to six having resistance values of 1, 2, 4, 8, 16, and 32 units respectively, and six gate signal generators including discriminators and connected in series to said second input terminal, said generators having predetermined discriminator voltage levels for producing signals equal to the voltage levels with impression thereon of input signals having amplitudes in excess of said voltage levels and said voltage levels corresponding to 1, 2, 4, 8, 16, and 32 voltage units, said gate signal generators being individually connected to gating circuits of said channels with the gate signal generator voltage levels being inversely related to the channel resistance whereby the signals at said output terminal are proportional to the product of input signals at said first and second input terminals.

8. A multiplier circuit as defined in claim 7 wherein each of said gate signal generators is identical and each comprises a biased discriminator producing a positive output gate signal in response to input signals having a voltage amplitude in excess of a predetermined minimum discriminator bias voltage and a negative signal equal to said bias voltage, a voltage divider connected between said discriminator input and negative voltage output whereby the midtap voltage thereof is equal to one-half the difference between the input signal and the discriminator bias voltage, and an amplifier having a gain of four connected between the voltage divider midtap and the gate signal generator output for providing to the next serially-connected gate signal generator a signal that is twice the difference between the input signal and the discriminator bias voltage.

References Cited in the file of this patent

UNITED STATES PATENTS

| | | |
|---|---|---|
| 2,630,481 | Johnson | Mar. 3, 1953 |
| 2,729,811 | Gloess | Jan. 3, 1956 |

FOREIGN PATENTS

| | | |
|---|---|---|
| 1,003,996 | France | Mar. 24, 1952 |

OTHER REFERENCES

"Special-Purpose Digital Data-Processing Computers," by Gordon et al., Proceedings of Association for Computing Machinery, May 1952.